United States Patent
Ionasec et al.

(10) Patent No.: US 8,009,887 B2
(45) Date of Patent: Aug. 30, 2011

(54) METHOD AND SYSTEM FOR AUTOMATIC QUANTIFICATION OF AORTIC VALVE FUNCTION FROM 4D COMPUTED TOMOGRAPHY DATA USING A PHYSIOLOGICAL MODEL

(75) Inventors: Razvan Ionasec, Princeton, NJ (US); Bogdan Georgescu, Plainsboro, NJ (US); Helene C. Houle, Sunnyvale, CA (US); Sebastian Vogt, Lawrenceville, NJ (US); Michael Scheuering, Nürnberg (DE); Estelle Camus, Mountain View, CA (US); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 574 days.

(21) Appl. No.: 12/288,215

(22) Filed: Oct. 17, 2008

(65) Prior Publication Data
US 2009/0123050 A1 May 14, 2009

Related U.S. Application Data

(60) Provisional application No. 60/984,749, filed on Nov. 2, 2007, provisional application No. 61/012,120, filed on Dec. 7, 2007, provisional application No. 61/020,513, filed on Jan. 11, 2008.

(51) Int. Cl.
*G06K 9/00* (2006.01)
(52) U.S. Cl. ..................... 382/128; 382/130
(58) Field of Classification Search .............. None
See application file for complete search history.

(56) References Cited

U.S. PATENT DOCUMENTS

| | | | |
|---|---|---|---|
| 6,598,307 B2 | 7/2003 | Love et al. | |
| 7,031,504 B1* | 4/2006 | Argiro et al. | 382/131 |
| 2005/0281447 A1 | 12/2005 | Moreau-Gobard et al. | |
| 2008/0085043 A1* | 4/2008 | Watanabe et al. | 382/131 |

* cited by examiner

*Primary Examiner* — Minh N Tang

(57) ABSTRACT

A method and system for modeling the aortic valve in 4D image data, such as 4D CT and echocardiography, is disclosed. An initial estimate of a physiological aortic valve model is determined for at least one reference frame of a 4D image sequence based on anatomic features in the reference frame. The initial estimate is refined to generate a final estimate in the reference frame. A dynamic model of the aortic valve is then generated by estimating the physiological aortic valve model for each remaining frame of the 4D image sequence based on the final estimate in the reference frame. The aortic valve can be quantitatively evaluated using the dynamic model.

31 Claims, 8 Drawing Sheets

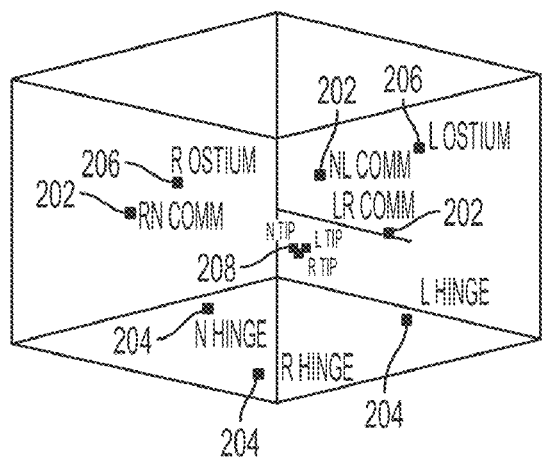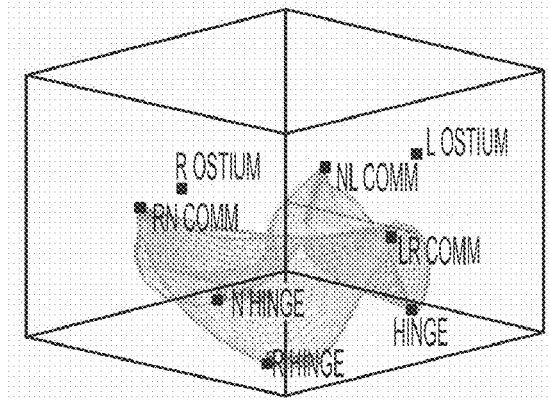
FIG. 2A  FIG. 2B
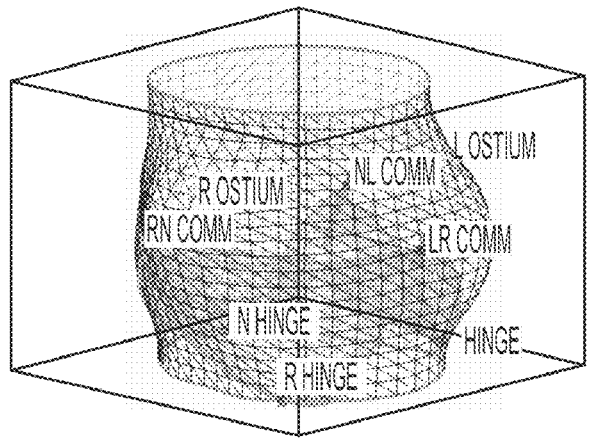
FIG. 2C (a) END-DIASTOLE    (b)    (c)    (c) END-SYSTOLE    (e)

METHOD AND SYSTEM FOR AUTOMATIC QUANTIFICATION OF AORTIC VALVE FUNCTION FROM 4D COMPUTED TOMOGRAPHY DATA USING A PHYSIOLOGICAL MODEL

This application claims the benefit of U.S. Provisional Application No. 60/984,749, filed Nov. 2, 2007, U.S. Provisional Application No. 61/012,120, filed Dec. 7, 2007, and U.S. Provisional Application No. 61/020,513, filed Jan. 11, 2008, the disclosures of which are herein incorporated by reference.

BACKGROUND OF THE INVENTION

The present invention relates to evaluation of the aortic valve using medical images, and more particularly, to modeling and quantitative evaluation of the aortic valve in 4D CT volume sequences.

Valvular heart disease (VHD) is a cardiac disorder that affects a large number of patients and often requires elaborate diagnostic procedures, intervention, and long-term management. Causes of VHD include congenital heart defects, rheumatic fever, infection, and coronary artery disease. Aortic valve disease represents the most common valvular disease in developed countries, and has the second highest incidence among congenital valve defects. Although aortic root preserving surgery can be used, and minimally evasive procedures are emerging, the management of patients with VHD remains challenging.

Most data on geometry and dynamics of the aortic valve has been obtained by experimental studies on explanted values, or using animal models. Standard dimensions of the aortic root can be found in the literature, although it is recognized that there may be considerable geometric variations. Conventional quantitative and visual methods for evaluating the function of the aortic valve are limited to 2D images, and can be affected significantly by measurement inaccuracies. Conventional valve models are used either for homodynamic studies, or for analysis of various prosthetic valves. Although some conventional models are generated from volumetric data, these models are generic and cannot be applied to the evaluation of individual patients. Accordingly, an aortic valve model that can be used for accurate quantitative and visual evaluation of and individual patient's aortic valve is desirable.

BRIEF SUMMARY OF THE INVENTION

The present invention provides a method and system for modeling the aortic valve using 4D computed tomography (CT) data in order to quantitatively evaluate the function of the aortic valve. The present inventors have developed a dynamic physiological model of the aortic valve, whose parameters can be automatically estimated for an individual patient from 4D CT volume sequences of the heart. The dynamic physiological model can be used to determine model-based measurements of the aortic valve's morphology and dynamics.

In one embodiment of the present invention, an initial estimate of a physiological aortic valve model is determined for at least one reference frame of a 4D image sequence based on anatomic features in the reference frame. The initial estimate is refined to generate a final estimate in the reference frame. A dynamic model of the aortic valve is then generated by estimating the physiological aortic valve model for each remaining frame of the 4D image sequence based on the final estimate in the reference frame. The aortic valve can be quantitatively evaluated using the dynamic model.

These and other advantages of the invention will be apparent to those of ordinary skill in the art by reference to the following detailed description and the accompanying drawings.

BRIEF DESCRIPTION OF THE DRAWINGS

FIG. 2 illustrates generating a 3D physiological aortic valve model based on anatomic landmarks;

DETAILED DESCRIPTION

Figure 1A:
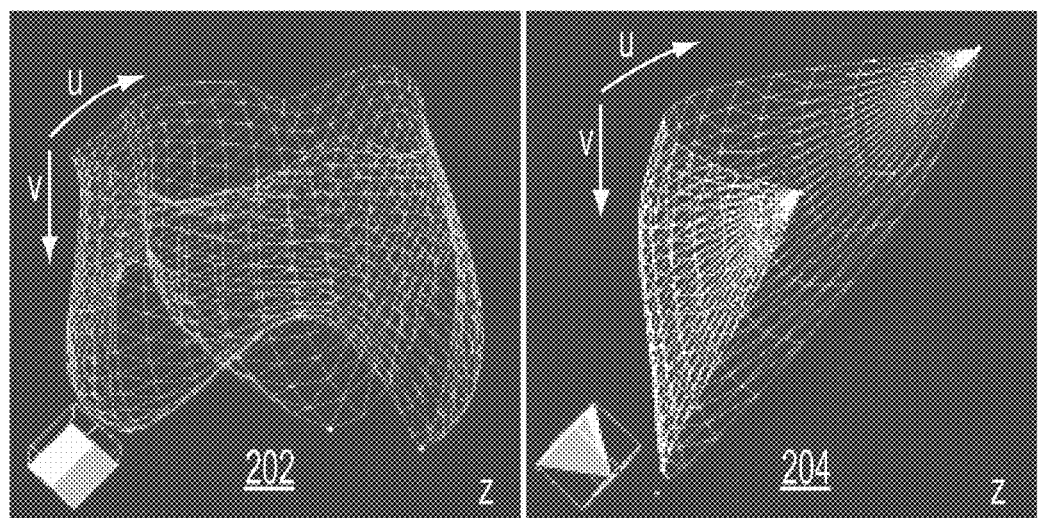
FIG. 1A illustrates the NURBS models representing the aortic root and the leaflets.

The present invention relates to modeling and quantitative evaluation of the aortic valve using 4D computed tomography (CT) data or echocardiography data. 4D CT data refers to dynamic CT volume sequences taken over a period of time, in which each frame is a 3D CT volume. Embodiments of the present invention are described herein to give a visual understanding of the heart modeling method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Embodiments of the present invention are described herein as using 4D CT data to model and quantitatively evaluate the aortic valve. It is to be understood that the present invention is not limited to CT data, but can be applied to other medical imaging techniques, such as echocardiography, that collect volumetric image data of the heart over a time period.

CT is a rapidly evolving modality for non-invasive imaging of the heart that enables dynamic four-dimensional (4D) evaluation of cardiac structures throughout the cardiac cycle. However, quantification of the aortic valve is impaired in conventional methods by the need to translate the 4D data set into a set of 2D planes in order to obtain measurements. This gives potentially erroneous results for the curved anatomy of the basal aorta. A 4D model derived from the CT data enables the non-invasive visualization and quantification of the dynamics of the human aortic root and leaflets in functional and diseased valves.

As described herein, the present inventors have developed a modeling framework for the aortic valve from 4D cardiac CT data. The modeling framework may also be used to model the aortic valve from echocardiography data. A dynamic model of the valve is developed from anatomic structures together with physiology driven geometrical and topological constraints. Patient specific parameters of the model are estimated from CT data by using learning-based parameter estimation. The parameter estimation can be performed in a three-stage method including landmark detection, full model fitting, and model dynamics estimation. The estimated model enables precise morphological and functional quantification, as well as enhanced visualization of the aortic valve.

The morphology and function of the aortic valve is complex, which is underlined by the lack of consensus regarding its optimal physical description. A set of well-defined landmarks, including hinges, commissures, leaflet tips, and coronary ostia, describe key anatomic landmarks of the aortic valve. The central anatomical features of the aortic valve are the aortic root and the three aortic valvular leaflets. The aortic root provides the supporting structures for the leaflets within the left ventricle and the ascending aorta. The aortic root extends from the basal attachments of the leaflets within the left ventricle to the sinutubular junction. Geometrically, the aortic root is a cylinder with three wall dilatations referred to as sinuses of the valsava. The leaflets, also called cusps, are attached to the root on semilunar structures within the valvular sinuses. Leaflets can be thought of as shirt pockets, with one edge stitched to the shirt and one edge free of attachment. These attachment structures interlink at the level of the sinutubular junction forming three commissures. Along with hinges, which described the basal ring, the commissures are relevant anatomic landmarks and part of various measurements of the aortic valve. The function of the aortic valve is to regulate blood flow between the left ventricle and the aorta. It hemodynamically separates the aorta and the left ventricle. When the ventricular pressure during systole exceeds that in the ascending aorta, the valve leaflets open. In diastole, when the ventricular pressure decreases to less than the aortic pressure, the valve leaflets close.

The present inventors have developed a physiology driven parametric 4D model capable of expressing a large spectrum of morphological and pathological variations of the aortic valve. The aortic root and the leaflets form the central anatomic structures of the aortic valve, and the geometries of the aortic root and the leaflets can be represented by non-uniform rational B-splines (NURBS), which are well known in computer modeling. These components, together with topological and geometrical constraints, define a physiologically compliant model of the aortic valve, capable of implicitly handling bicuspid malformations.

The aortic root connects the left ventricular outflow tract to the ascending aorta, and provides the supporting structures for the leaflets. This is represented by a NURBS surface $C^{root}(u,v)$ closed in the u parametric direction, and can be considered a deformed cylinder constrained by the hinge, commissure, and ostium points. The constraints imposed on control points guarantee an anatomically consistent modeling of the aortic root. The NURBS representation of the aortic root surface can be expressed as:

$$C^{root}(u,v)\Big|_{u,v \in [0,1]} = \frac{\sum_{i=0}^{n}\sum_{j=0}^{m} N_{i,d}(u) N_{j,e}(v) w_{i,j} P_{i,j}^{root}}{\sum_{i=0}^{n}\sum_{j=0}^{m} N_{i,d}(u) N_{j,e}(v) w_{i,j}} \quad (1)$$

$$P_{i,j}^{root} = P_{i-n,j}^{root},\ 0 \le l \le d,\ 0 \le j \le m$$

$$C^{root}(u_k^h, v_k^h) = L_k^h,\ 0 \le k < 3$$

$$C^{root}(u_k^c, v_k^c) = L_k^c,\ 0 \le k < 3$$

$$C^{root}(u_k^o, v_k^o) = L_k^o,\ 0 \le k < 2$$

where $p_{i,j}^{root}$ are control points, $w_{i,j}$ are the corresponding weights, and $N_{i,d}(u)$ and $N_{j,e}(u)$ are the $d^{th}$ and $e^{th}$ degree B-splines basis functions defined on the non-periodic knot vectors U and V, respectively. The root surface $C^{root}$ passes through the hinges $L_h^r$, commissure $L_c^r$, and ostrium $L_o^r$ landmarks at parametric locations $(u_k^h, v_k^h)$, $(u_k^c, v_k^c)$, and $(u_k^o, v_k^o)$, respectively.

The three valvular leaflets, expressed as NURBS paraboloids, are fixed to the root on an attachment crown delineated by the hinges and commissures, while the remaining free edge of each leaflet is constrained by a corresponding tip point. The leaflets open and close during the cardiac cycle allowing one-way blood flow during systole, from the left ventricle to the aorta. The leaflets can be represented as:

$$C^{leaf^l}(u,v)\Big|_{u,v \in [0,1]} = \frac{\sum_{i=0}^{n}\sum_{j=0}^{m} N_{i,d}(u) N_{j,e}(v) w_{i,j} P_{i,j}^{leaf^l}}{\sum_{i=0}^{n}\sum_{j=0}^{m} N_{i,d}(u) N_{j,e}(v) w_{i,j}} \quad (2)$$

$$P_{0,0}^{leaf^l} = P_{0,j}^{leaf^l} = L_l^c,\ 0 \le j \le m$$

$$p_{n,0}^{leaf^l} = P_{n,j}^{leaf^l} = L_{l+1}^c,\ 0 \le j \le m$$

$$C^{leaf^l}(u_l^h, v_l^h) = L_l^h$$

$$C^{leaf^l}(u_l^t, v_l^t) = L_l^t$$

$$C^{leaf^l}(u,0) = C^{root}(u_k^l, v_k^l)$$

where $C^{leaf^l}$ stands for the $l^{th}$ leaflet surface, $P_{i,j}^{leaf^l}$ are control points, $w_{i,j}$ are the corresponding weights, and $N_{i,d}(u)$ and $N_{j,e}(u)$ are the $d^{th}$ and $e^{th}$ degree B-splines basis functions defined on the non-periodic knot vectors U and V, respectively. The leaflet surface converges into the adjacent commissures $L_l^c$ and $L_{l+1}^c$, passes through the corresponding hinge $L_l^h$ and tip $L_l^t$, and the 0-isocurve lies on the root at parametric locations $(u_k^l, v_k^l)$. The source and sink points, which delineate the leaflets, are the commissure points. Together with the hinge points, which described the basal ring, the commissure points are represented as discrete points in the 3D space, and are the anatomical landmarks detected in the model fitting method described below. The hinges and the commissures are located at the local extrema on the crown-like semilunar attachment structure, which links the leaflets to the aortic root. The attachment crown is defined by the lowest iso-curve in the v parametric direction of the root's surface.

Figure 1B:
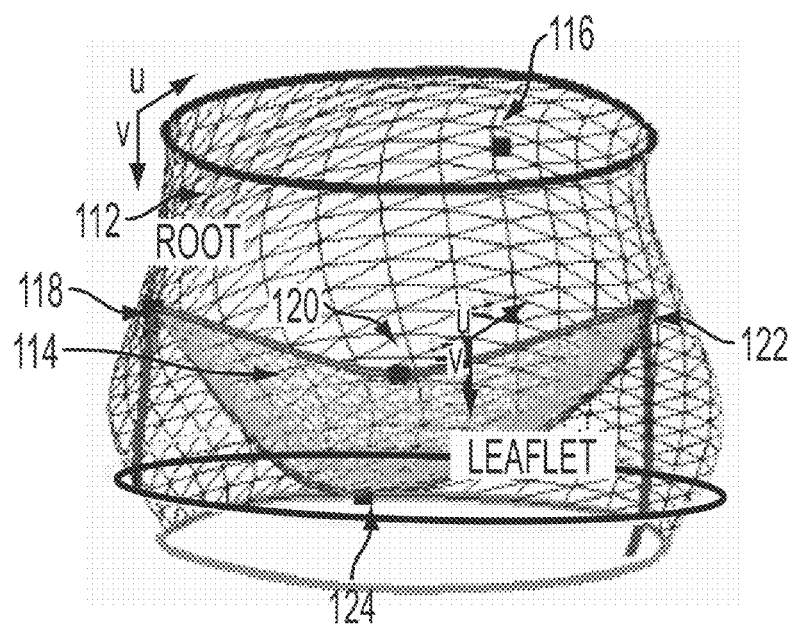
FIG. 1B illustrates a physiology based aortic valve model in perspective view.

FIG. 1A illustrates the NURBS models representing the aortic root and the leaflets. As illustrated in FIG. 1A, image 102 shows the NURBS model and the spatial parametric directions (u,v) for the aortic root, and image 104 shows the NURBS model and the spatial parametric directions (u,v) for the leaflets. FIG. 1B illustrates a physiology based aortic valve model in perspective view. As illustrated in FIG. 1B, the root 112 and the leaflet 114 are modeled using NURBS, and u and v are the circumferential and height parametric directions, respectively, of the root 112 and the leaflet 114. Control points 116, 118, 120, 122, 124 are also shown in FIG. 1B. Control points 116, 118, 120, 122, and 124, refer to an ostium, a commissure point, a leaflet point, a commissure point, and a hinge point, respectively.

It is straightforward within the NURBS framework to extend the above presented static 3D model to a 4D dynamic model using the tensor product, which introduces a temporal parametric direction t to the model representation.

In order to apply the above-described physiological aortic valve model to individual patients, the parameters of the valve model are estimated for each individual patient for 4D cardiac CT data. FIG. 2 illustrates generating a 3D physiological aortic valve model based on anatomic landmarks. Image (a) illustrates anatomic landmarks used as parameters (control points) for the valve model. As shown in image (a), according to an embodiment of the present invention, 3 commissures 202, 3 hinge points 204, two ostia 206, and 3 leaflet tips 208 are used as control points. Image (b) shows the NURBS model for the leaflets fit to the anatomic landmarks of image (a). Image (c) shows the NURBS model for the root (i.e., the entire physiological valve model) fit to the anatomic landmarks of image (a). The 4D cardiac CT data is a dynamic sequence of 3D cardiac CT volumes taken over a time period for a patient. A specific instance of the model can be exactly determined by the landmarks and NURBS control points in a 4D Euclidean space (3D+time), which cumulates into 3T(11+300) parameters. Due to the high dimension of the parameter vector, direct estimation in the original space is very difficult. As described herein, embodiments of the present invention utilize a three-stage approach of landmark detection, full model fitting, and model dynamics estimation in order to estimate the parameters of the dynamic valve model. Such a three-stage approach can be used in modeling and quantitative evaluation of individual patients' aortic valves.

Figure 3:
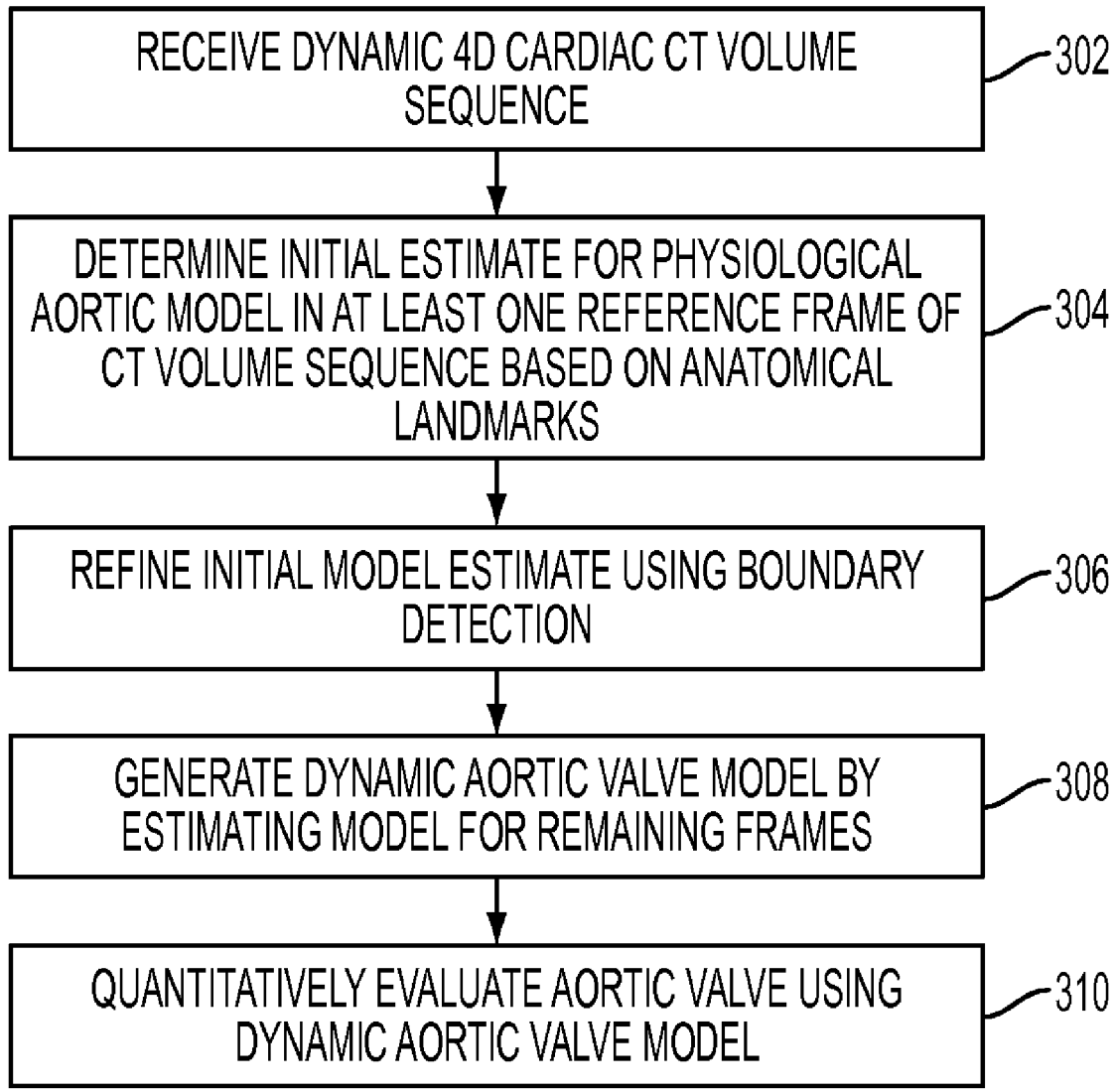
FIG. 3 illustrates a method for modeling and evaluating an aortic valve according to an embodiment of the present invention.

FIG. 3 illustrates a method for modeling and evaluating an aortic valve according to an embodiment of the present invention. At step 302, a dynamic 4D cardiac CT volume sequence is received. The dynamic 4D cardiac CT volume sequence is a sequence of 3D cardiac CT volumes taken over a period of time. Each 3D CT volume in the sequence can be referred to as a frame of the sequence. For example, the 4D cardiac CT data can be received directly from a CT scanning device in real time as the CT volumes are scanned. It is also possible that the 4D cardiac CT data can be received by loading a cardiac CT volume sequence stored in a memory or storage of a computer system, or some other computer readable medium.

At step 304, an initial estimate of the physiological aortic valve model is determined in at least one reference frame of the 4D cardiac CT volume sequence based on anatomical landmarks detected in the reference frame. According to various possible implementations, since the most dominant anatomical landmarks can be observed in the end-diastolic (ED) and the end-systolic (ES) phases of the cardiac cycle, one or both of the frames corresponding to the ED and ES phases can be used as the reference frames. This step corresponds to the landmark detection stage of the three-stage modeling approach described above. In order to determine the initial estimate of the aortic valve model, anatomical landmarks are automatically detected in the reference frames using discriminative learning and incremental searching techniques. The goal of such landmark detection is to determine $L_i=(x_i, y_i, z_i)$, where $L_i$ defines a location of the $i^{th}$ landmark in the 3D volume. In particular, in order to estimate the parameters of the above described physiology-based aortic valve model, the landmark locations $(L_h^r, L_e^r, L_o^r, L_t^r)$, corresponding to the control points of hinge, commissure, ostium, and tip, can be detected in the reference frames.

A training set, which contains positive and negative samples of landmark positions, can be created from a manually annotated database for each landmark. Based on the training set, a discriminative classifier $H(x,y,z)$ is trained using a Probabilistic Boosting Tree (PBT), which learns the target distribution by exploiting a divide and conquer strategy expressed as:

$$p(L_i|x_s,y_s,z_s)=H_i(x_s,y_s,z_s), x_s,y_s,z_s \in D_i \qquad (3)$$

Where $p(L_i|x_s,y_s,z_s)$ is the probability of landmark $L_i$ at location $(x_s,y_s,z_s)$, $H_i$ is the strong classifier trained for $L_i$, and $D_i$ is the search domain obtained from the training set.

In order to improve efficiency, the landmark detection is performed in a coarse-to-fine manner, as well as in incrementally increasing parameter spaces, similar to multiple space learning (MSL). MSL significantly reduces the complexity of search spaces by using sequential sampling. The idea is to sequentially learn discriminative classifiers in spaces of increasing dimensions and to propagate only relevant samples. This focuses the learning process only on the relevant regions of the space, and also makes the search for the target object tractable in high dimensional space.

In addition to the anatomical landmarks, an artificial point C is detected and is defined as the center of gravity of the landmarks. C enables a search space reduction, as the position variance of each landmark relative to C is significantly smaller than, for example, the position variance of each landmark to the image origin. Hence, the search space for each landmark is four orders of magnitude smaller and is delimited by the maximal detection error and relative landmark position with respect to C.

Figure 4:
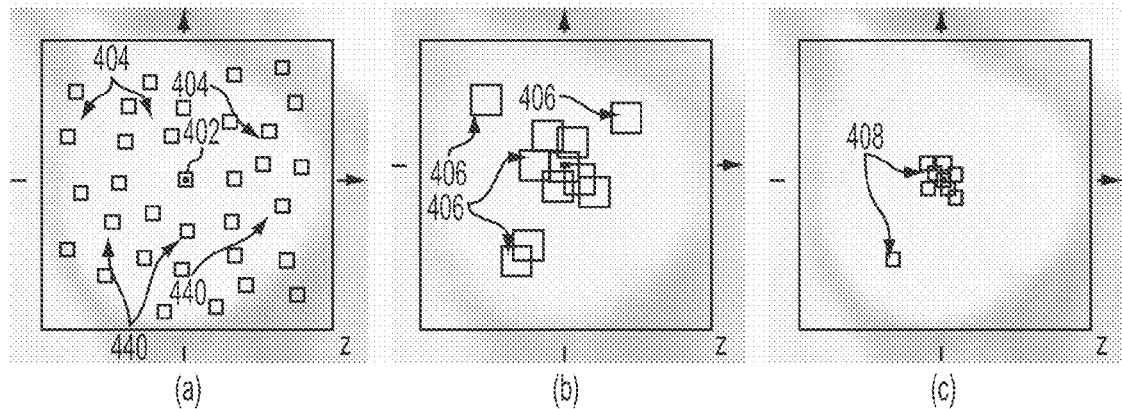
FIG. 4 illustrates coarse-to-fine detection of an anatomic landmark in exemplary CT data.

For the aortic valve landmark detection, the coarse-to-fine detection strategy involves three stages: detection of C in low resolution (e.g., 3 mm), refinement of C in high resolution (e.g., 1 mm), followed by detection of the anatomic landmarks (e.g., 3 commissure points and 3 hinge points). A set of hypotheses $C^h$, which contains possible locations of C with a high probability, is updated in each stage by a corresponding detector. Each detector can be trained using a PBT, as described above, based on Haar features. The final position of the landmark is determined as the mean of it's location candidates $C^h$ at the highest resolution. FIG. 4 illustrates coarse-to-fine detection of an anatomic landmark in exemplary CT data. As illustrated in FIG. 4, image (a) shows examples of a positive sample 402 and negative samples 404 used for training the landmark detectors. Image (b) shows location candidates 406 (i.e., $C^h$) for an anatomic landmark in a low resolution image resulting from a first detector. Image (c) shows location candidates 408 (i.e., $C^h$) for the anatomic landmark in a high resolution image resulting from a second detector. For the exemplary anatomic landmark of FIG. 4, the location of the landmark is determined as the mean of the location candidates 408 shown in image (c). Each anatomical landmark is detected in this manner.

The detected anatomic landmarks provide a set of corresponding points, $K=\{(L_i^m, L_i^l), L_i^M \in M, L_i^l \in I, 0<i\leq N\}$. From these points a thin-plate-spline (TPS) transformation can be calculated, which maps each point in the physiological aortic valve model, M, to a corresponding location in the reference frame of the 4D cardiac CT volume sequence. This provides an initial model estimate in the reference frame.

The TPS transformation used to map the aortic valve model to the reference frame can be expressed as:

$$P_i^d = T_{TPS}(P_i^m) \qquad (4)$$

$$T_{TPS}(P_i^m) := \begin{bmatrix} A & b \\ 0 \ldots 0 & 1 \end{bmatrix} \begin{bmatrix} P_i^m \\ 1 \end{bmatrix} + \begin{bmatrix} \sum_{i=1}^{n} w_i U(|L_i^m - P_i^m|) \\ 0 \end{bmatrix}.$$

The TPS transformation includes global affine parameters and local non-affine components. These parameters are selected to minimize bending energy:

$$\int\int_{R^2} \left(\frac{\partial^2 T_{TPS}}{\partial x^2}\right)^2 + 2\left(\frac{\partial^2 T_{TPS}}{\partial x \partial y}\right)^2 + \left(\frac{\partial^2 T_{TPS}}{\partial y^2}\right)^2 dx dy. \qquad (5)$$

Since this is a close-form solution, the linear system can be solved using well known methods. Accordingly, the TPS transformation does not require predefined parameters.

Returning to FIG. 3, at step 306, the initial model estimate in the reference frame is refined using boundary detection. The initial estimation obtained through landmark detection and TPS transformation provides an accurate global fitting of the aortic valve model, however further local processing is required for precise object delineation. A set of samples is obtained from the parametric model that provides an appropriate discrete representation of the aortic valve. Although an adaptive sampling in the computational space may be more accurate, an advantageous implementation utilizes a uniform sampling performed in the parametrical space. This is computationally efficient and robust, as the model parameterization is consistent with the underlying anatomical structure.

A boundary detector is trained using a PBT in combination with steerable features. The boundary detector is applied locally to a set of discrete boundary locations, and used to evolve the shape of the boundary locations to high probability responses of the boundary detector. The final estimation for the physiological aortic model in the reference frame is obtained by fitting the model to the refined samples (boundary locations) by solving a linear least squares problem. Approximation may be more effective than interpolation for fitting the model to the refined boundary locations, as the resulting model captures the geometrical information, rather than passing through each sample set that may contain outliers. Moreover, the nonlinearity of the approximation problem is reduced to a linear least squares problem, as only the control points of the model need to be calculated.

Figure 5:
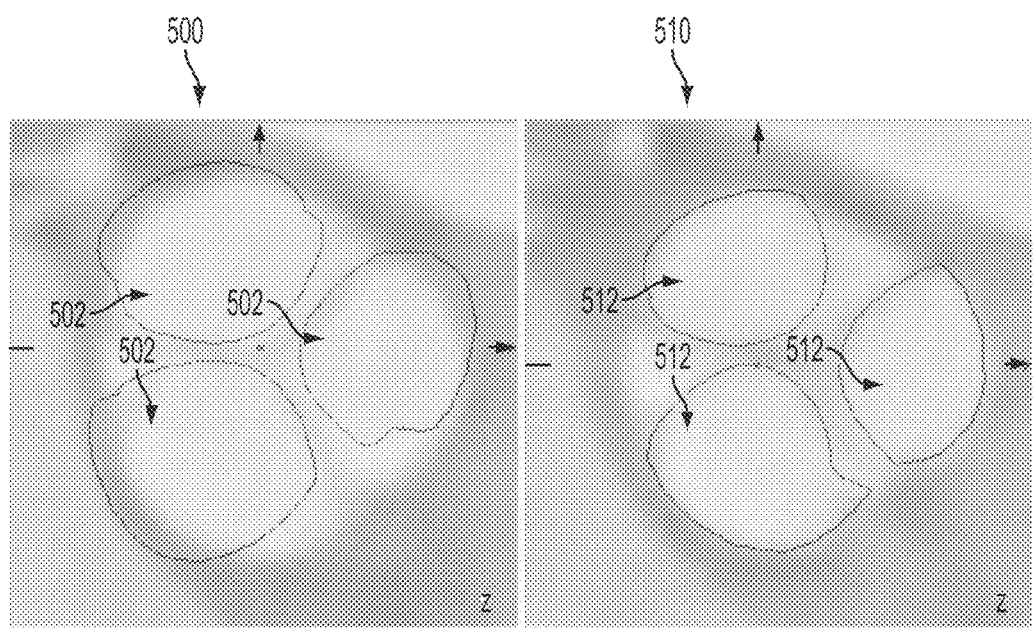
FIG. 5 illustrates an exemplary physiological aortic valve model fit to a reference CT frame.

FIG. 5 illustrates an exemplary physiological aortic valve model fit to a reference CT frame. As illustrated in FIG. 5, image 500 shows the initial estimation 502 of the aortic valve model based on anatomical landmarks. Image 510 shows final aortic valve model 512 after model refinement base on the local boundary detection.

Returning to FIG. 3, at step 308, a dynamic aortic valve model is generated by estimating the aortic valve model for remaining frames in the cardiac cycle. The simplest way to extract the dynamic valve model is to perform full parameter estimation for each volume in the input 4D CT volume sequence separately. However, this solution may not be advantageous because the algorithm is computationally expensive, the extracted motion is noisy and the method allows for temporally inconsistent solutions. According to an advantageous implementation, the estimation of the dynamic valve model follows a physiology-driven strategy and is more accurate and efficient compared to separate full parameter estimation for each frame of the input sequence. As described above, the valve model is estimated for at least one reference frame. The valve model is estimated in remaining frames in a sequence representing a cardiac cycle by using the estimated valve model in the reference frame(s) to determine an initial aortic valve model for each frame, and refining the initial aortic initial valve for each frame using local boundary detection.

In an advantageous embodiment, the frames representing the end-diastolic (valve is completely closed) and end-systolic (valve is completely open) phases of cardiac cycle are used as the reference frames. The most dominant shapes are observed in these frames, as the valves are either completely closed or completely open. The initial model estimation for each of the remaining frames is a prior model constructed as a linear combination of the two reference frames. The initial model for each frame is then refined for each frame, as described in step 306.

Figure 6:
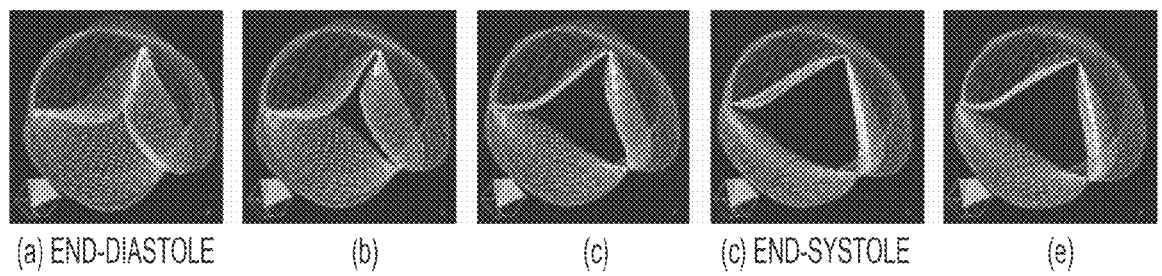
FIG. 6 illustrates a dynamic model generated from CT sequence.

Once the dynamic aortic valve model is generated in step 308, the dynamic valve model can be output. For example the dynamic valve model can be output be displaying the dynamic valve model on a display of a computer system. The dynamic valve model can also be output by storing the dynamic valve model, for example to a computer readable medium or storage or memory of a computer system. FIG. 6 illustrates a dynamic model generated from CT sequence. As illustrated in FIG. 6, images (a)-(e) shown five frames of a dynamic aortic valve model obtained from a sequence of cardiac CT volumes. Image (a) is the aortic valve model for the end-diastole cardiac phase, and image (d) is the aortic valve model for the end-systole cardiac phase.

Returning to FIG. 3, at step 310, the aortic valve is quantitatively evaluated using the dynamic aortic valve model. The dynamic aortic valve model provides the corner stone for efficient clinical evaluation of the aortic valve. The dynamic aortic valve model tracks landmarks of the aortic valve, such as hinges, commissures, and ostia, since these landmarks are explicitly modeled and detected in order to fit the model to the image data. The locations of these landmarks are important in aortic valve physiology, and can be used as reference points in the 3D domain, and for calculating various aortic valve measurements.

Figure 7:
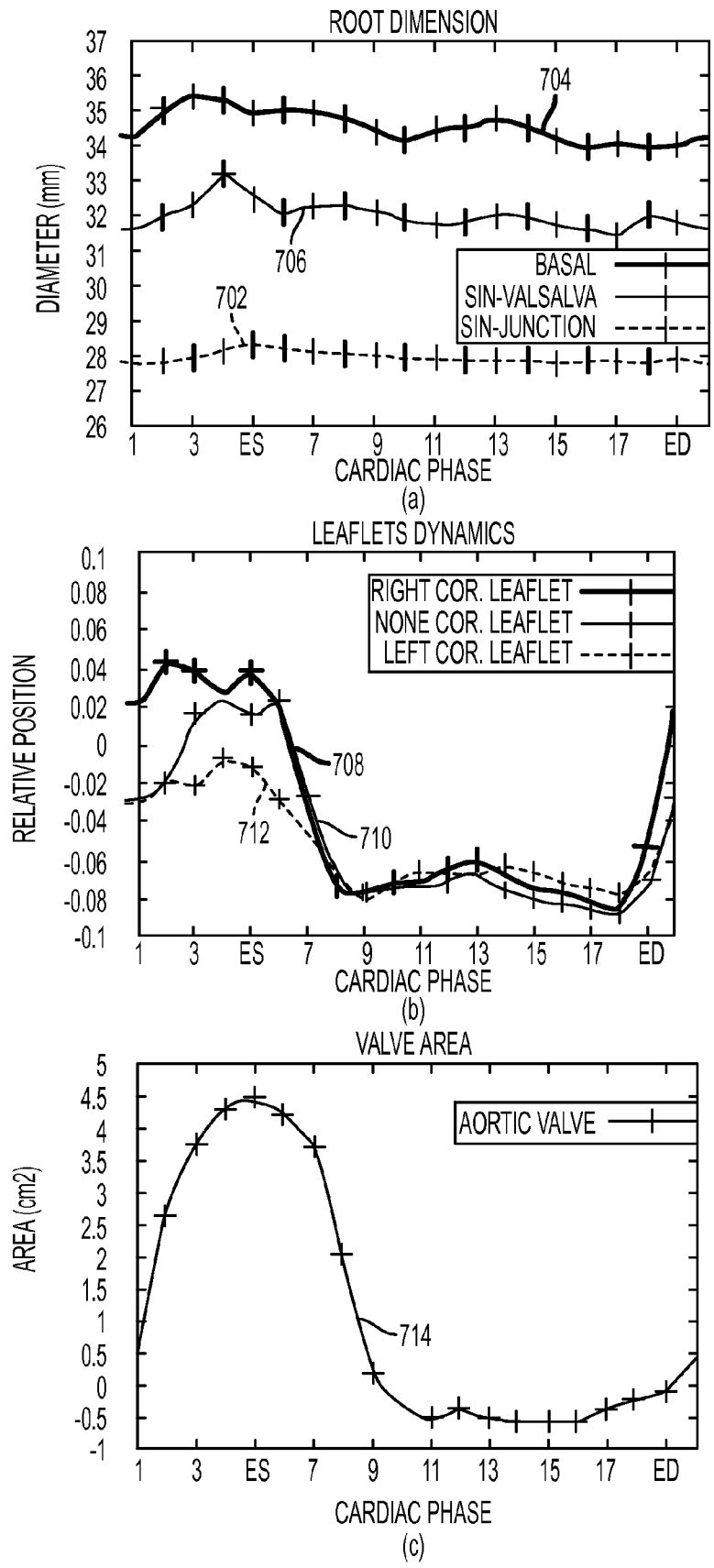
FIG. 7 illustrates exemplary dynamic aortic valve measurements calculated based on a dynamic aortic valve model.

The dynamic aortic valve model can be used to calculate dynamic valve area measurements in any axial position. For example, measurements such as the root diameter of the aortic valve, the leaflet position of the aortic valve, the root area of the aortic valve, the coaptation distance relative to the hinge plane, the inter-commissural distance, the ostium height relative to the hinge plane, and the commissure height relative to the hinge plane, can be measured over a cardiac cycle using the dynamic aortic valve model. Such measurements can be used for severity evaluation, surgical planning, and patient monitoring. FIG. 7 illustrates exemplary dynamic aortic valve measurements calculated based on a dynamic aortic valve model. As illustrated in FIG. 7, image (a) shows the root diameter over the cardiac phase at three locations: basal 702 (at the location of the hinges), sinuses of valsalva 704, and the sinutubular junction 706. Image (b) shows the relative position of the leaflet tips (right coronary leaflet 708, none coronary leaflet 710, and left coronary leaflet 712) to the basal ring over the cardiac phase. Image (c) shows the aortic valve area 714 over the cardiac phase. The dynamic aortic valve model can also be used to calculate complex morphological and dynamic measurements, such as rapid valve opening velocity (RVOV) and rapid valve closing velocity (ROCV).

Figure 8:
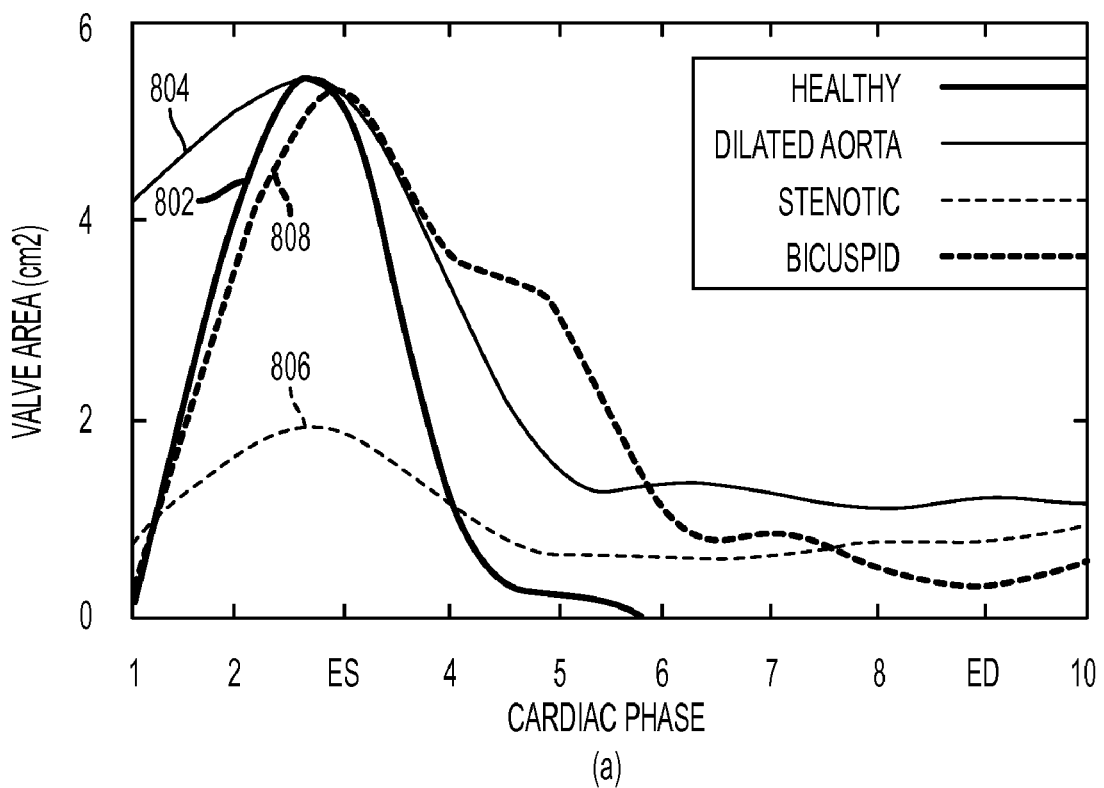
FIG. 8 illustrates comparing different pathologies using dynamic aortic valve model measurements.
Figure 8:
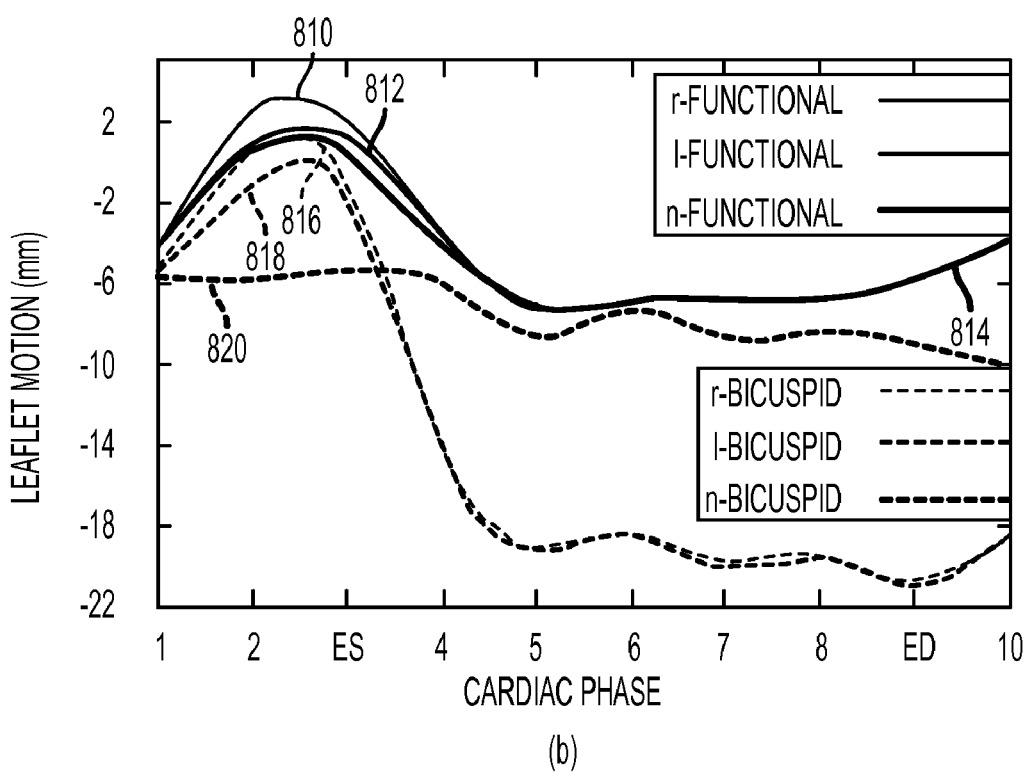

The measurements of the aortic valve using the dynamic aortic valve model can be used to compare different pathologies. FIG. 8 illustrates comparing different pathologies using dynamic aortic valve model measurements. As illustrated in image (a), the valve area over the cardiac phase, measured using the dynamic aortic valve model, is compared for a healthy aortic valve 802, a dilated aorta 804, a stenotic aortic valve 806, and a bicuspid aortic valve 808. As illustrated in image (b), leaflet motion over the cardiac phase, measured using the dynamic aortic valve model, is compared for the right, left, and none leaflets of a functional aortic valve 810, 812, and 814 and a bicuspid aortic valve 816, 818, and 820.

Figure 9:
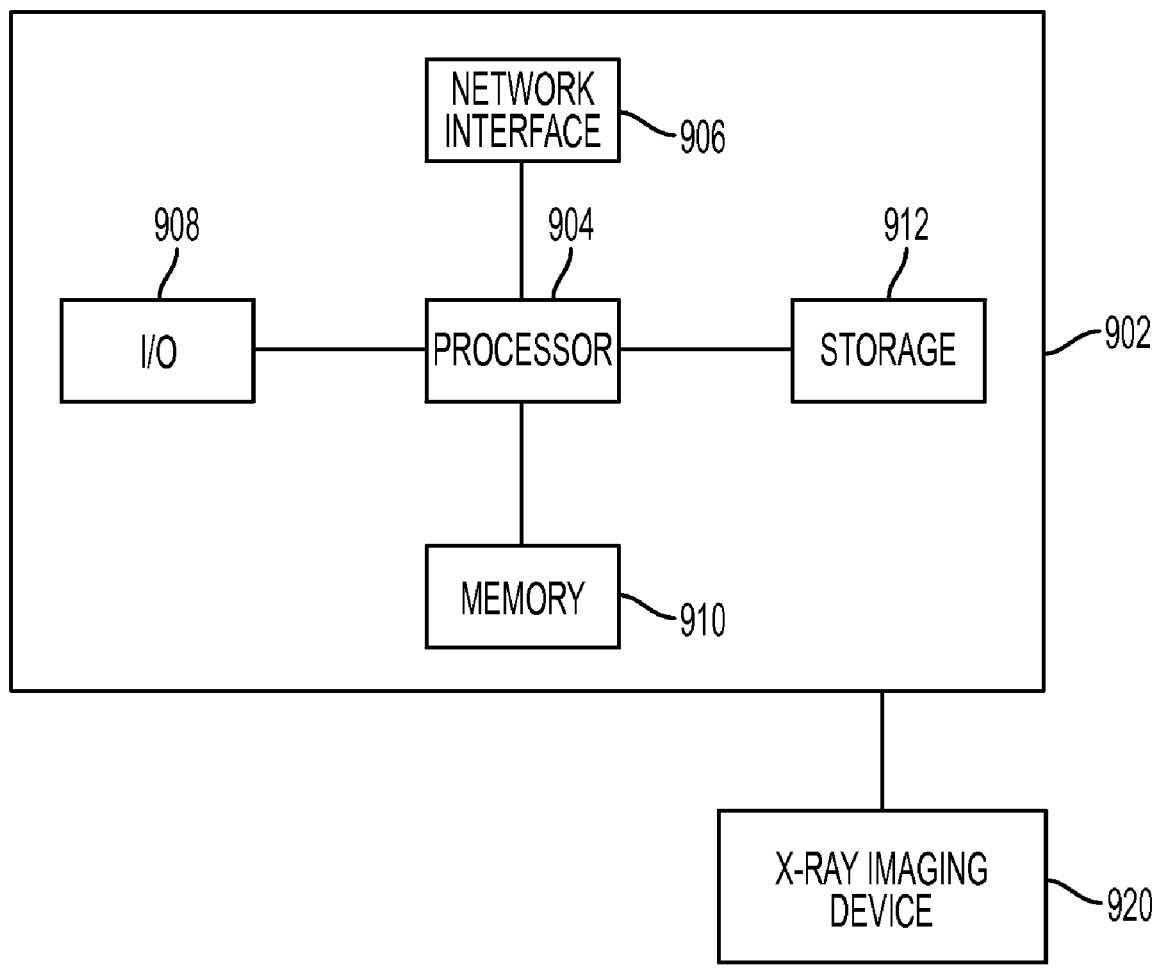
FIG. 9 is a high-level block diagram of a computer capable of implementing the present invention.

The above-described methods for modeling and evaluating an aortic valve may be implemented on a computer using well-known computer processors, memory units, storage devices, computer software, and other components. A high-level block diagram of such a computer is illustrated in FIG. 9. Computer 902 contains a processor 904, which controls the overall operation of the computer 902 by executing computer program instructions which define such operation. The computer program instructions may be stored in a storage device 912 (e.g., magnetic disk) and loaded into memory 910 when execution of the computer program instructions is desired. Thus, the steps of the method of FIG. 3 may be defined by the computer program instructions stored in the memory 910 and/or storage 912 and controlled by the processor 904 executing the computer program instructions. An image acquisition device 920, such as a CT scanning device, can be connected to the computer 902 to input the 3D volumes to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). Such input/output devices 908 may be used in conjunction with a set of computer programs as an annotation tool to annotate volumes received from the image acquisition device 920. One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating a dynamic aortic valve model, comprising:
receiving a 4D cardiac image sequence comprising a plurality of frames, each frame comprising 3D image data;
determining an initial estimate for a physiological aortic valve model in at least one reference frame of the plurality of frames based on anatomical landmarks in the at least one reference frame;
refining the initial estimate for the physiological aortic valve model in the at least one reference frame using boundary detection to generate a final estimate for the physiological aortic valve model in the at least one reference frame; and
generating a dynamic aortic valve model by estimating the physiological aortic valve model for remaining frames of the plurality of frames based on the final estimate for the physiological aortic valve model in the at least one reference frame.

2. The method of claim 1, wherein the physiological aortic valve model represents an aortic root and leaflets of the aortic valve by non-uniform rational B-splines (NURBS), and applies topological and geometrical constraints to the NURBS to define a physiologically compliant model of the aortic valve.

3. The method of claim 1, wherein said step of determining an initial estimate for a physiological aortic valve model in at least one reference frame of the plurality of frames based on anatomical landmarks in the at least one reference frame comprises:
detecting a plurality of anatomic features in the at least one reference frame; and
calculating a thin-plate-spline transformation based on the plurality of detected anatomic features; and
mapping the physiological aortic valve model to the at least one reference frame using the thin-plate-spline transformation.

4. The method of claim 3, wherein said step of detecting a plurality of anatomic features in the at least one reference frame comprises, for each of the plurality of anatomic features:
detecting candidates for a center of gravity of the anatomic feature at a low resolution in the at least one reference frame using a first trained detector;
detecting candidates for the center of gravity of the anatomic feature at a high resolution in the at least one reference frame using a second trained detector; and
determining a location of the anatomic feature in the at least one reference frame by calculating the mean of the candidates for the center of gravity of the anatomic feature at the high resolution.

5. The method of claim 4, wherein each of the first and second detectors are trained based on training data using a probabilistic boosting tree.

6. The method of claim 4, wherein the plurality of anatomic features comprises three commissure points, three hinge points, two ostia, and three leaflet tips.

7. The method of claim 1, wherein said step of refining the initial estimate for the physiological aortic valve model in the at least one reference frame using boundary detection to generate a final estimate for the physiological aortic valve model in the at least one reference frame comprises:
detecting local boundaries in the at least one reference frame at boundary locations of the initial estimate of the physiological aortic valve model using a trained boundary detector;
evolving boundaries in the initial estimate of the physiological aortic valve model based on the detected local boundaries; and
fitting the physiological aortic valve model to the evolved boundaries.

8. The method of claim 7, wherein the boundary detector is trained using a probabilistic boosting tree with steerable features.

9. The method of claim 7, wherein said step of fitting the physiological aortic valve model to the evolved boundaries comprises:
fitting the physiological aortic valve model to the evolved boundaries using linear least squares approximation.

10. The method of claim 1, wherein said step of generating a dynamic aortic valve model by estimating the physiological aortic valve model for remaining frames of the plurality of frames based on the final estimate for the physiological aortic valve model in the at least one reference frame comprises:
determining an initial estimate for the physiological aortic valve model for each of the remaining frames in the plurality of frames based on the final estimate for the physiological aortic valve model in the at least one reference frame; and
refining the initial estimate for the physiological aortic valve model in each of the remaining frames in the plurality of frames using boundary detection to generate a final estimate for the physiological aortic valve model in each of the remaining frames.

11. The method of claim 10, wherein the at least one reference frame comprises a first reference frame and a second reference frame representing end-diastole and end-systole phases of a cardiac cycle, respectively, and said step of determining an initial estimate for the physiological aortic valve model for each of the remaining frames in the plurality of frames based on the final estimate for the physiological aortic valve model in the at least one reference frame comprises:
determining the initial estimate for the physiological aortic valve model for each of the remaining frames in the plurality of frames as a linear combination of the final estimate for the physiological aortic valve model in the first and second reference frames.

12. The method of claim 1, further comprising:
quantitatively evaluating the aortic valve using the dynamic aortic valve model.

13. The method of claim 12, wherein said step of quantitatively evaluating the aortic valve using the dynamic aortic valve model comprises:
dynamically measuring at least one of root diameter of the aortic valve, leaflet position of the aortic valve, root area of the aortic valve, coaptation distance relative to a hinge plane, inter-commissural distance, ostium height relative to the hinge plane, and commissure height relative to the hinge plane, over a cardiac cycle.

14. The method of claim 1, wherein said 4D image sequence is a 4D computed tomography (CT) sequence.

15. The method of claim 1, wherein said 4D image sequence is echocardiography image data.

16. An apparatus for generating a dynamic aortic valve model, comprising:
means for receiving a 4D cardiac image sequence comprising a plurality of frames, each frame comprising 3D image data;
means for determining an initial estimate for a physiological aortic valve model in at least one reference frame of the plurality of frames based on anatomical landmarks in the at least one reference frame;
means for refining the initial estimate for the physiological aortic valve model in the at least one reference frame using boundary detection to generate a final estimate for the physiological aortic valve model in the at least one reference frame; and
means for generating a dynamic aortic valve model by estimating the physiological aortic valve model for remaining frames of the plurality of frames based on the final estimate for the physiological aortic valve model in the at least one reference frame.

17. The apparatus of claim 16, wherein the physiological aortic valve model represents an aortic root and leaflets of the aortic valve by non-uniform rational B-splines (NURBS), and applies topological and geometrical constraints to the NURBS to define a physiologically compliant model of the aortic valve.

18. The apparatus of claim 16, wherein said means for determining an initial estimate for a physiological aortic valve model in at least one reference frame of the plurality of frames based on anatomical landmarks in the at least one reference frame comprises:
means for detecting a plurality of anatomic features in the at least one reference frame; and
means for calculating a thin-plate-spline transformation based on the plurality of detected anatomic features; and
means for mapping the physiological aortic valve model to the at least one reference frame using the thin-plate-spline transformation.

19. The apparatus of claim 18, wherein said means for detecting a plurality of anatomic features in the at least one reference frame comprises:
means for detecting candidates for a center of gravity of an anatomic feature at a low resolution in the at least one reference frame using a first trained detector;
means for detecting candidates for the center of gravity of the anatomic feature at a high resolution in the at least one reference frame using a second trained detector; and
means for determining a location of the anatomic feature in the at least one reference frame by calculating the mean of the candidates for the center of gravity of the anatomic feature at the high resolution.

20. The apparatus of claim 16, wherein said means for refining the initial estimate for the physiological aortic valve model in the at least one reference frame using boundary detection to generate a final estimate for the physiological aortic valve model in the at least one reference frame comprises:
means for detecting local boundaries in the at least one reference frame at boundary locations of the initial estimate of the physiological aortic valve model using a trained boundary detector;
means for evolving boundaries in the initial estimate of the physiological aortic valve model based on the detected local boundaries; and
means for fitting the physiological aortic valve model to the evolved boundaries.

21. The apparatus of claim 16, wherein said means for generating a dynamic aortic valve model by estimating the physiological aortic valve model for remaining frames of the plurality of frames based on the final estimate for the physiological aortic valve model in the at least one reference frame comprises:
means for determining an initial estimate for the physiological aortic valve model for each of the remaining frames in the plurality of frames based on the final estimate for the physiological aortic valve model in the at least one reference frame; and
means for refining the initial estimate for the physiological aortic valve model in each of the remaining frames in the plurality of frames using boundary detection to generate a final estimate for the physiological aortic valve model in each of the remaining frames.

22. The apparatus of claim 21, wherein the at least one reference frame comprises a first reference frame and a second reference frame representing end-diastole and end-systole phases of a cardiac cycle, respectively, and said means for determining an initial estimate for the physiological aortic valve model for each of the remaining frames in the plurality of frames based on the final estimate for the physiological aortic valve model in the at least one reference frame comprises:
  means for determining the initial estimate for the physiological aortic valve model for each of the remaining frames in the plurality of frames as a linear combination of the final estimate for the physiological aortic valve model in the first and second reference frames.

23. The apparatus of claim 16, further comprising:
  means for quantitatively evaluating the aortic valve using the dynamic aortic valve model.

24. A computer readable medium encoded with computer executable instructions for generating a dynamic aortic valve model, the computer executable instructions defining steps comprising:
  receiving a 4D cardiac image sequence comprising a plurality of frames, each frame comprising 3D image data;
  determining an initial estimate for a physiological aortic valve model in at least one reference frame of the plurality of frames based on anatomical landmarks in the at least one reference frame;
  refining the initial estimate for the physiological aortic valve model in the at least one reference frame using boundary detection to generate a final estimate for the physiological aortic valve model in the at least one reference frame; and
  generating a dynamic aortic valve model by estimating the physiological aortic valve model for remaining frames of the plurality of frames based on the final estimate for the physiological aortic valve model in the at least one reference frame.

25. The computer readable medium of claim 24, wherein the physiological aortic valve model represents an aortic root and leaflets of the aortic valve by non-uniform rational B-splines (NURBS), and applies topological and geometrical constraints to the NURBS to define a physiologically compliant model of the aortic valve.

26. The computer readable medium of claim 24, wherein the computer executable instructions defining the step of determining an initial estimate for a physiological aortic valve model in at least one reference frame of the plurality of frames based on anatomical landmarks in the at least one reference frame comprise computer executable instructions defining the steps of:
  detecting a plurality of anatomic features in the at least one reference frame; and
  calculating a thin-plate-spline transformation based on the plurality of detected anatomic features; and
  mapping the physiological aortic valve model to the at least one reference frame using the thin-plate-spline transformation.

27. The computer readable medium of claim 26, wherein the computer executable instructions defining the step of detecting a plurality of anatomic features in the at least one reference frame comprise computer executable instructions for defining the following steps for each of the plurality of anatomic features:
  detecting candidates for a center of gravity of the anatomic feature at a low resolution in the at least one reference frame using a first trained detector;
  detecting candidates for the center of gravity of the anatomic feature at a high resolution in the at least one reference frame using a second trained detector; and
  determining a location of the anatomic feature in the at least one reference frame by calculating the mean of the candidates for the center of gravity of the anatomic feature at the high resolution.

28. The computer readable medium of claim 24, wherein the computer executable instructions defining the step of refining the initial estimate for the physiological aortic valve model in the at least one reference frame using boundary detection to generate a final estimate for the physiological aortic valve model in the at least one reference frame comprise computer executable instructions defining the steps of:
  detecting local boundaries in the at least one reference frame at boundary locations of the initial estimate of the physiological aortic valve model using a trained boundary detector;
  evolving boundaries in the initial estimate of the physiological aortic valve model based on the detected local boundaries; and
  fitting the physiological aortic valve model to the evolved boundaries.

29. The computer readable medium of claim 24, wherein the computer executable instructions defining the step of generating a dynamic aortic valve model by estimating the physiological aortic valve model for remaining frames of the plurality of frames based on the final estimate for the physiological aortic valve model in the at least one reference frame comprise computer executable instructions defining the steps of:
  determining an initial estimate for the physiological aortic valve model for each of the remaining frames in the plurality of frames based on the final estimate for the physiological aortic valve model in the at least one reference frame; and
  refining the initial estimate for the physiological aortic valve model in each of the remaining frames in the plurality of frames using boundary detection to generate a final estimate for the physiological aortic valve model in each of the remaining frames.

30. The computer readable medium of claim 29, wherein the at least one reference frame comprises a first reference frame and a second reference frame representing end-diastole and end-systole phases of a cardiac cycle, respectively, and the computer executable instructions defining the step of determining an initial estimate for the physiological aortic valve model for each of the remaining frames in the plurality of frames based on the final estimate for the physiological aortic valve model in the at least one reference frame comprise computer executable instructions defining the step of:
  determining the initial estimate for the physiological aortic valve model for each of the remaining frames in the plurality of frames as a linear combination of the final estimate for the physiological aortic valve model in the first and second reference frames.

31. The computer readable medium of claim 24, further comprising computer executable instructions defining the step of:
  quantitatively evaluating the aortic valve using the dynamic aortic valve model.

* * * * *